US012772021B2

(12) United States Patent
Prateek et al.

(10) Patent No.: US 12,772,021 B2
(45) Date of Patent: Oct. 20, 2026

(54) RETROACTIVE GEOFENCE EVENTS

(71) Applicant: Amazon Technologies, Inc., Seattle, WA (US)

(72) Inventors: Swagata Prateek, Vancouver (CA); Olivier Joseph Serge Durand de Gevigney, Squamish (CA); Cory Eden, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 438 days.

(21) Appl. No.: 18/374,857

(22) Filed: Sep. 29, 2023

(65) Prior Publication Data

US 2025/0113160 A1 Apr. 3, 2025

(51) Int. Cl.
*H04W 4/021* (2018.01)

(52) U.S. Cl.
CPC .................................. *H04W 4/021* (2013.01)

(58) Field of Classification Search
CPC ..... H04W 4/021; H04W 4/023; H04W 4/025; H04W 4/029; H04L 67/52; H04L 67/55; H04L 67/306; G08B 21/0261
USPC ....................................................... 455/456.1
See application file for complete search history.

(56) References Cited

U.S. PATENT DOCUMENTS 10,135,992 B2 * 11/2018 Kumar ............... G06Q 10/1093
10,136,252 B2 * 11/2018 Shepherd .............. H04W 12/02
10,509,100 B1 * 12/2019 Reed ..................... H04W 4/023
11,810,047 B2 * 11/2023 Kovalova ............... G06F 21/31
12,127,070 B2 * 10/2024 Ulewicz ................ H04W 12/64
12,229,622 B1 * 2/2025 Welch ................... G06T 19/006
2003/0171845 A1 * 9/2003 Flores .................... B65H 39/02
700/223

(Continued)

FOREIGN PATENT DOCUMENTS

CN 114199274 A 3/2022
JP 7428264 B2 * 2/2024 ........... H04W 4/021

(Continued)

OTHER PUBLICATIONS

"Fallacies of distributed computing"; ; https://en.wikipedia.org/wiki/Fallacies_of_distributed_computing; Wikipedia; retrieved Sep. 25, 2023; 2 pages.

(Continued)

*Primary Examiner* — Jean A Gelin
(74) *Attorney, Agent, or Firm* — BakerHostetler

(57) ABSTRACT

A plurality of location indications may be received that indicate locations of an object at a plurality of times. A plurality of geofence indications that indicate that the object is within a geofence may be generated based on the plurality of location indications. A plurality of notifications of a plurality of geofence events corresponding to the object may be provided, to an account, based on the plurality of geofence indications. The plurality of geofence events may include a geofence entering event and a geofence exiting event. An out-of-order location indication may be detected within the plurality of location indications. A retroactive geofence event regarding which the account has not yet been notified may be determined based on the out-of-order location indication. An additional notification of the retroactive geofence event may be provided to the account.

20 Claims, 9 Drawing Sheets

(56) References Cited

U.S. PATENT DOCUMENTS

| | | | | |
|---|---|---|---|---|
| 2007/0120736 | A1* | 5/2007 | MacKenzie | G01S 13/825 340/572.1 |
| 2007/0176771 | A1* | 8/2007 | Doyle | G08B 13/1427 340/539.13 |
| 2012/0242470 | A1* | 9/2012 | Morgan | B60R 25/04 340/426.19 |
| 2014/0162693 | A1* | 6/2014 | Wachter | H04W 4/021 455/456.3 |
| 2014/0330737 | A1* | 11/2014 | Williams | G06Q 10/0833 705/333 |
| 2015/0088792 | A1* | 3/2015 | O'Neill | G06N 20/00 706/12 |
| 2015/0281889 | A1* | 10/2015 | Menendez | H04W 4/021 455/456.1 |
| 2016/0253617 | A1* | 9/2016 | Truong | G06Q 50/40 705/7.15 |
| 2016/0357782 | A1* | 12/2016 | Jones | G06F 16/258 |
| 2017/0118592 | A1* | 4/2017 | Patel | H04W 60/00 |
| 2019/0090085 | A1* | 3/2019 | Masterson | H04M 1/72457 |
| 2019/0213640 | A1* | 7/2019 | Buchman | G06Q 30/0261 |
| 2019/0261128 | A1* | 8/2019 | Lyman | H04W 4/021 |
| 2020/0196092 | A1* | 6/2020 | Jones | H04W 4/021 |
| 2020/0314587 | A1* | 10/2020 | Gurin | G06Q 10/047 |
| 2021/0133665 | A1* | 5/2021 | Hsiao | H04W 4/029 |
| 2021/0144509 | A1* | 5/2021 | Hicks | H04L 51/046 |
| 2021/0274307 | A1* | 9/2021 | Dym | G06Q 10/1091 |
| 2021/0385610 | A1* | 12/2021 | Zhang | G06F 16/29 |
| 2022/0147922 | A1* | 5/2022 | Cawse | H04W 4/38 |
| 2023/0385726 | A1* | 11/2023 | Turpin | G06Q 10/063114 |
| 2024/0037248 | A1* | 2/2024 | Gandhi | G06F 21/577 |
| 2025/0071509 | A1* | 2/2025 | Srivastava | H04W 4/12 |

FOREIGN PATENT DOCUMENTS

| | | | | |
|---|---|---|---|---|
| JP | 7513108 B2 | * | 7/2024 | G01C 21/26 |
| KR | 20230171993 A | * | 12/2023 | G06F 21/88 |
| RU | 2642348 C2 | * | 1/2018 | H04W 52/0251 |

OTHER PUBLICATIONS

Hellerstein et al.; "Keeping Calm: when distributed consistency is easy"; Communication of the ACM; vol. 63 No. 9; Sep. 2020; p. 72-81.

L. Lamport; "Time, Clocks, and the Ordering of Events in a Distributed System"; Communications of the ACM; vol. 21 No. 7; Jul. 1978; p. 558-565.

International Patent Application No. PCT/US2024/048338; Int'l Search Report and the Written Opinion; dated Jan. 16, 2025; 16 pages.

* cited by examiner

Properly Ordered Geofence Data Table 200

| Location Indication 201 | State 202 | Geofence Indications 203 | Device Location 204 | Sample Time 205 | Receive Time 206 | Geofence Events 207 |
|---|---|---|---|---|---|---|
| 111A | S1 | G1, G2 | L1 | ST1 | RT1 | None |
| 111B | S2 | G2, G3, G5 | L2 | ST2 | RT2 | D(S1, S2) = { Enter(G5), Enter (G3), Exit(G1) } |
| 111C | S3 | G2 | L3 | ST3 | RT3 | D(S2, S3) = { Exit(G3), Exit(G5) } |
| 111D | S4 | G2 | L4 | ST4 | RT4 | D(S3, S4) = None |
| 111E | S5 | G6, G7 | L5 | ST5 | RT5 | D(S4, S5) = { Enter(G6), Enter(G7), Exit(G2) } |

| | |
|---|---|
| First Induced Geofence Events 401 | (e.g., Computed Based on First State Difference between Branch Point Location Indication and Out-of-Order Location Indication)<br><br>D(S1, S2) = { Enter(G5), Enter (G3), Exit(G1) } |
| Second Induced Geofence Events 402 | (e.g., Computed Based on Second State Difference between Out-of-Order and Transition Point Location Indication)<br><br>D(S2, S3) = { Exit(G3), Exit(G5) } |
| Event Union 403 | (Union of First Induced Geofence Events 401 and Second Induced Geofence Events 402)<br><br>D(S2, S3)  D(S1, S2) = { Exit(G3), Exit(G5), Enter(G5), Enter (G3), Exit(G1) } |

FIG. 4

| | |
|---|---|
| Relevant Previously Reported Events 501 | (e.g., Computed Based on Third State Difference between Branch Point Location Indication and Transition Point Location Indication)<br><br>D(S1, S3) = { Exit(G1) } |
| Event Subtraction 502 | (Subtract Relevant Previously Reported Events 501 from Induced Event Union 403)<br><br>D(S2, S3) D(S1, S2) - D(S1, S3) = { Exit(G3), Exit(G5), Enter(G5), Enter (G3), Exit(G1) } - { Exit(G1) }<br>= { Exit(G3), Exit(G5), Enter(G5), Enter (G3) } |
| Retroactive Geofence Events 503 | (Result of Event Subtraction 502)<br><br>Exit(G3), Exit(G5), Enter(G5), Enter (G3) } |

FIG. 5

RETROACTIVE GEOFENCE EVENTS

BACKGROUND

Location services may allow customers to define a geofence and to track an object's location. For example, a location service may receive indications of an object's locations over time. Upon receiving a location indication, the location service may compare the location indication to a geofence area, such as to determine whether the object is currently within a geofence. The location service may use these determinations to provide notifications to a customer of geofence events, such as when a tracked object has entered, or exited, a geofence. These geofence events may be stateful. For example, in some cases, a geofence enter event may be published only when an object moves from a location outside a geofence to a location within the geofence. As another example, in some cases, a geofence exit event may be published only when an object moves from a location within a geofence to a location outside of the geofence.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 is a diagram illustrating example induced geofence events that may be used in accordance with the present description.

FIG. 5 is a diagram illustrating example retroactive geofence event computations that may be used in accordance with the present description.

DETAILED DESCRIPTION

Figure 1:
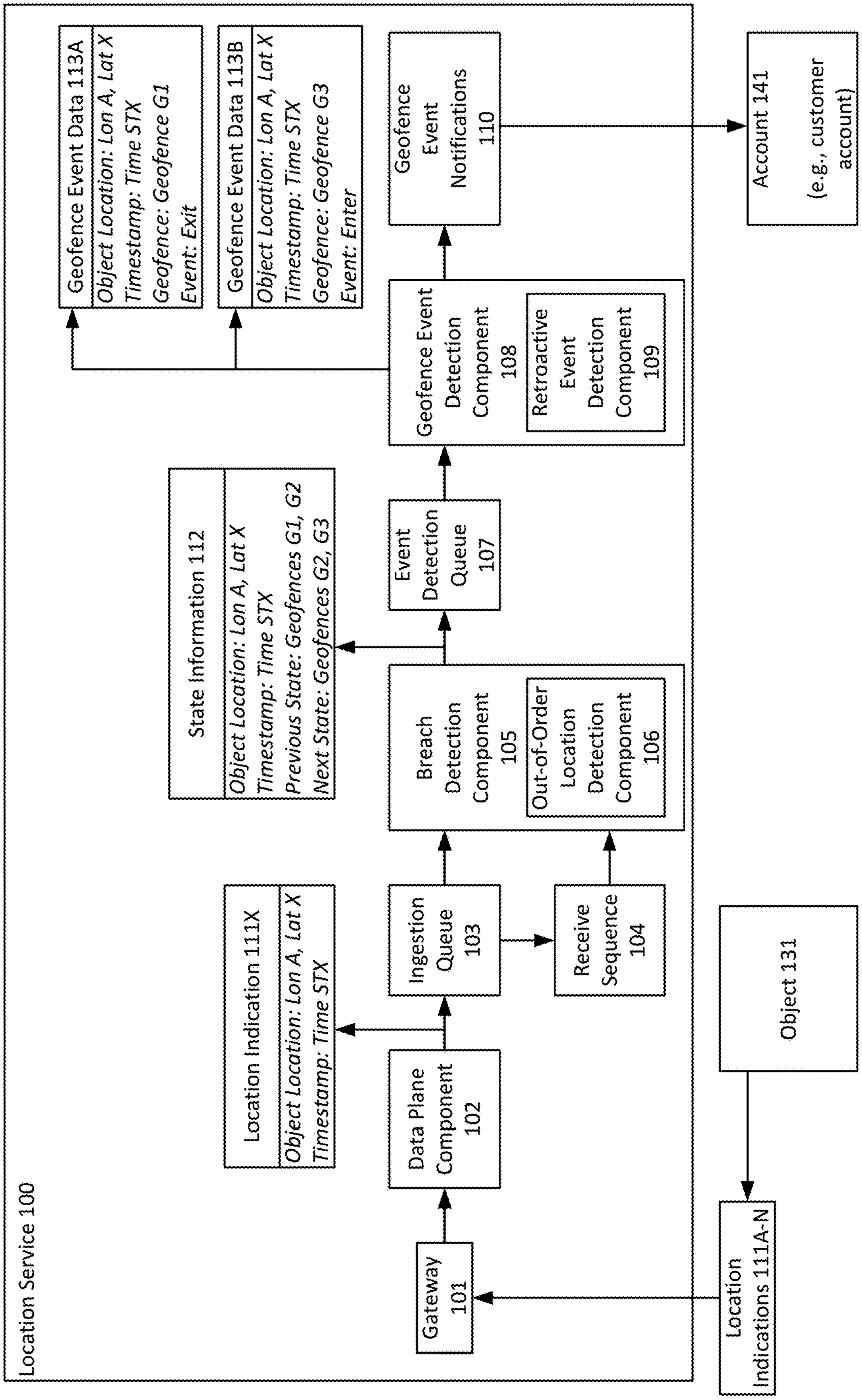
FIG. 1 is a diagram illustrating an example retroactive geofence event notification system that may be used in accordance with the present description.

Techniques for notifications of retroactive geofence events are described herein. A geofence, as that term is used herein, refers to a defined geographic space. A geofence may be a closed area, such as a given building, or a designated perimeter around a given building. A geofence may also be an open area, such as any location north of a given boundary (e.g., a given longitude value, territorial boundary, etc.).

Geofences may, for example, correspond to street addresses or groups thereof, structures or portions thereof (e.g., wings of building, rooms, etc.), and many other defined geographic spaces. In some examples, geofences may be defined and/or expressed using location metrics, such as longitude and latitude coordinates, street addresses, and the like.

In some examples, a customer of a location service may define one or more geofences. The customer may also request that the location service track an object's location and provide notifications relating to an object's location relative to a geofence. In some examples, this may assist the customer with tasks such as resource management, billing, security, and many others. In one specific example, a company may wish to know when a given resource has entered and/or exited a given geofence, such as a company facility or external worksite. In some examples, the tracked object may periodically sample and transmit location indications to report its location to the location service, such as at regular repeating intervals (e.g., once per minute, etc). A location indication may include location information, such as longitude and latitude coordinates representing the object's current location at the time of sampling. A location indication may also include time information (e.g., a timestamp) indicating a time at which the location is sampled.

Upon receiving a location indication, the location service may compare the location indication to a geofence area, such as to determine whether the object is within a geofence at the time that the location indication is sampled. For example, to determine whether an object is within a geofence, the location service may compare the longitude and latitude coordinates reported by the object to longitude and latitude coordinates of the geofence. When a location indication indicates that a tracked object is within a given geofence, the location service may issue a geofence indication indicating that the object is within the given geofence. The location service may use these geofence indications to provide notifications to a customer of geofence events, such as when a tracked object has entered, or exited, a geofence. These geofence events may be stateful. For example, in some cases, a geofence enter event may be published only when an object moves from a location outside a geofence to a location within the geofence. As another example, in some cases, a geofence exit event may be published only when an object moves from a location within a geofence to a location outside of the geofence.

In order to be processed, location indications may be received by a processing component of the location service. In some cases, a location indication may not be received by a location service processing component in the correct order. An out-of-order location indication, as that term is used herein, refers to a location indication that is received sufficiently late that the associated system has already processed one or more subsequent location indications that should have been processed after the out-of-order location indication. In at least some conventional systems, geofence events associated with out-of-order location indications may sometimes not be computed and, therefore, may not be reported to customers.

There are a variety of circumstances that may cause an out-of-order location indication to occur. In one specific example, a tracked object may temporarily loose network connectivity at the time that the out-of-order location indication is supposed to be transmitted, thereby causing the transmission of the out-of-order location indication to initially fail. The tracked object may then re-gain network connectivity any may transmit one or more subsequently sampled location indications. The tracked object may eventually determine that it has failed to transmit the out-of-order location indication. The tracked object may then re-attempt and successfully transmit the out-of-order location indication. However, this successful transmission of the out-of-order location indication may not occur until after the one or more subsequently sampled location indications have already been transmitted to the location service. Thus, even though the out-of-order location indication was sampled prior to the one or more subsequently sampled location indications, the out-of-order location indication is not actually received by the location service until after the one or more subsequently sampled location indications have already been received. Out-of-order location indications may also be caused by other factors, such as internal processing errors within the location service.

The techniques described herein may allow a location service to detect an out-of-order location indication, to determine retroactive geofence events corresponding to the out-of-order location indication, and to provide notifications of those retroactive geofence events to a customer. Specifically, the location service may detect an out-of-order location indication, such as by comparing the sample time of the out-of-order location indication to the sample times of one more previously received location indications. In some cases, if a sample time of a given location indication is earlier than the sample time of one or more previously received location indications, then the given location indication may be detected as an out-of-order location indication.

Upon determining that a received location indication is an out-of-order location indication, the location service may determine one or more retroactive geofence events associated with the out-of-order location indication. A retroactive geofence event is a corrective geofence event that changes an incorrect reality of a system. For example, a retroactive geofence event may be triggered by an out-of-order location indication because a processing component may be unaware of locations/states associated with the out-of-order location indication at the time that one or more subsequently sampled location indications are being processed. This may, for example, cause the processing component to be unaware of state (e.g., location) transitions between the out-of-order location indication and a previously sampled location indication. This may also, for example, cause the processing component to be unaware of state (e.g., location) transitions between the out-of-order location indication and a subsequently sampled location indication.

As described in detail below; to determine retroactive geofence events, the location service may determine a branch point location indication associated with the out-of-order location indication. A branch point is an occurrence at which a system diverges from a state it would have achieved if it had processed information in a correct order. The branch point location indication may, therefore, be the last location indication that was sampled prior to the out-of-order location indication. The location service may then compute one or more first induced geofence events based on a first state difference between the out-of-order location indication and the branch point location indication. The location service may also determine a transition point location indication, which is the next location indication that is sampled after the out-of-order location indication. The location service may then compute one or more second induced geofence events based on a second state difference between the out-of-order location indication and the transition point location indication. The location service may then compute an event union that is a union of the one or more first induced events and the one or more second induced events. The location service may then subtract, from the event union, one or more previously reported events (if any) corresponding to a third state difference between the branch point location indication and the next location indication. After subtracting the previously reported events (if any), the remaining events may be the retroactive geofence events. Upon determining the retroactive geofence events, the location service may provide, to the customer, notifications of the retroactive geofence events.

FIG. 1 is a diagram illustrating an example retroactive geofence event notification system that may be used in accordance with the present description. As shown in FIG. 1, a location service 100 may track, over time, a location of an object 131. For example, account 141 may request that the location service 100 track the location of object 131. The account 141 may be a customer account corresponding to a customer of the location service 100. The object 131 may be any object that moves, and/or is moved, over time. The object 131 may be, or may include, a computing device that is capable of determining its current location and transmitting indications thereof. In some examples, the object 131 may be included in, or attached to, a moving and/or movable device, such as a vehicle, a piece of equipment, etc. Also, in some examples, the object may be a device that is carried by person, such as a smartphone that is carried by a person. In this manner, when the person is carrying the object, the person's location may be tracked by tracking the location of the object.

As shown, the object 131 may periodically sample and transmit location indications 111A-N to report its location to the location service 100. The location indications 111A-N may be sampled and transmitted at regular repeating intervals (e.g., once per minute, etc). Each location indication 111A-N may include location information, such as longitude and latitude coordinates representing the current location of object 131 at the time that the location is sampled. Each location indication 111A-N may also include time information (e.g., a timestamp) indicating a time that the location is sampled. As an example, a location indication 111X is shown in FIG. 1. The location indication 111X includes a time information, which is a timestamp indicating that the location indication 111X was sampled at sample time STX. The location indication 111X also includes location information indicating that object 131 is at longitude A and latitude X at the time that location indication 111X is sampled (sample time STX).

The location indications 111A-N may be received by gateway 101 of location service 100. A data plane component 102 may then insert the location indications 111A-N into an ingestion queue 103. In some examples, the data plane component 102 may be, or may include, a serverless computing function, which as an event-triggered function for which a customer is charged based on usage as opposed to set amounts of reserved resources. Breach detection component 105 may receive location indications 111A-N from the ingestion queue 103, such as by obtaining the location indications 111A-N from the ingestion queue 103. In some examples, the breach detection component 105 may be, or may include, a serverless computing function.

Upon receiving a location indication, the breach detection component 105 may compare the location indication 111A-N to a geofence area, such as to determine whether the object 131 is within a geofence at the time that the location indication 111A-N is sampled. For example, to determine whether object 131 is within a geofence, the breach detection component 105 may compare the longitude and latitude coordinates reported by the object 131 to longitude and latitude coordinates of the geofence. When a location indication 111A-N indicates that object 131 is within a given geofence, the breach detection component 105 may issue a geofence indication indicating that the object is within the given geofence.

As a specific example, based on the location indication 111X, the breach detection component 105 may provide state information 112. The state information 112 indicates that in a previous state (prior to sample time STX), the object 131 was located within geofences G1 and G2. However, in the next state (at sample time STX), the object 131 is located within geofences G2 and G3. Thus, in this example, the location of object 131 at sample time STX (which is the intersection of longitude A and latitude X) is within both geofence G2 and G3. Accordingly, state information 112 includes a geofence indication, which indicates that object 131 is within geofences G2 and G3 at sample time STX.

The geofence indications determined by breach detection component 104 may be inserted into event detection queue 107. The geofence event detection component 108 may then retrieve the geofence indications from the event detection queue 107. The geofence event detection component 108 may use these geofence indications to detect geofence events, such as when a tracked object has entered, or exited, a geofence. These geofence events may be stateful. For example, in some cases, a geofence enter event may be published only when an object moves from a location outside a geofence to a location within the geofence. As another example, in some cases, a geofence exit event may be published only when an object moves from a location within a geofence to a location outside of the geofence. The location service 100 may then provide, to account 141, geofence event notifications 110 corresponding to the geofence events that are detected by geofence event detection component 108.

As an example, geofence event data 113A corresponds to a geofence exit event that is determined based on state information 112. Specifically, state information 112 indicates that, in a previous state (prior to sample time STX), the object 131 was located within geofences G1 and G2. However, in the next state (at sample time STX), the object 131 is located within geofences G2 and G3. Based on this information, the geofence event detection component 108 may determine that object 131 has exited geofence G1 at sample time STX. Thus, a corresponding one of geofence event notifications 110 may be issued, to account 141, to indicate that object 131 has exited geofence G1 at sample time STX.

As another example, geofence event data 113B corresponds to a geofence entrance event that is also determined based on state information 112. Specifically, state information 112 indicates that, in a previous state (prior to sample time STX), the object 131 was located within geofences G1 and G2. However, in the next state (at sample time STX), the object 131 is located within geofences G2 and G3. Based on this information, the geofence event detection component 108 may determine that object 131 has entered geofence G3 at sample time STX. Thus, a corresponding one of geofence event notifications 110 may be issued, to account 141, to indicate that object 131 has entered geofence G3 at sample time STX.

As described above, in some cases, a location indication 111A-N may not be received by a location service processing component (e.g., breach detection component 105) in the correct order. An out-of-order location indication, as that term is used herein, refers to a location indication 111A-N that is received sufficiently late that the associated system has already processed one or more subsequent location indications that should have been processed after the out-of-order location indication. In the example of FIG. 1, breach detection component 105 includes an out-of-order location detection component 106 which may detect out of order location indications within location indications 111A-N. In some examples, out-of-order location detection component 106 may detect out-of-order location indications by comparing the sample time of a given location indication to the sample time of one more previously received location indications. In some cases, if a sample time of the given location indication is earlier than the sample time of one or more previously location indications, then the given location indication is an out-of-order location indication.

As also shown in FIG. 1, geofence event detection component 108 includes retroactive event detection component 109, which may compute retroactive geofence events based on out-of-order location indications. When the out-of-order location detection component 106 detects an out-of-order location indication, it may compute state information corresponding to the out-of-order location indication and, in some cases, indicate that this state information corresponds to an out-of-order location indication, such as by marking the state information with a special out-or-order tag (or other similar marker). In this manner, when the state information for the out-of-order location information is received by the geofence event detection component 108, it will be apparent that this state information should be analyzed to compute retroactive geofence events. The retroactive event detection component 109 may then analyze the state information corresponding to the out-of-order location indication to compute retroactive geofence events. Some specific examples and algorithms for computation of retroactive geofence events are discussed in detail below with reference to FIGS. 3-5.

Figure 2:
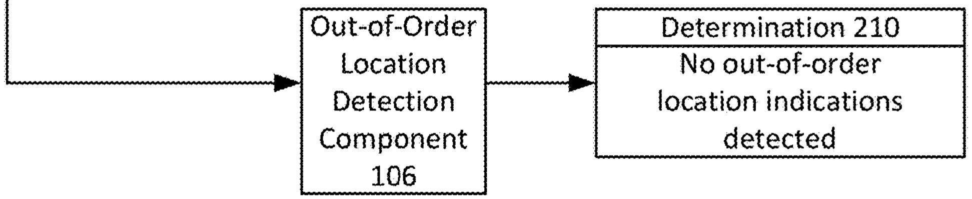
FIG. 2 is a diagram illustrating example properly ordered geofence data that may be used in accordance with the present description.

Referring now to FIG. 2, an example of properly ordered geofence data will now be described in detail. Specifically, FIG. 2 shows a properly ordered geofence data table 200 that includes example properly ordered geofence data. Geofence data table 200 includes a location indication column 201, a state column 202, a geofence indications column 203, a device location column 204, a sample time column 205, a receive time column 206, and a geofence events column 207. Location indication column 201 indicates a given location indication to which each row of the properly ordered geofence data table 200 corresponds (including location indications 111A-E). State column 202 indicates a state (including states S1-S5) associated with each of location indications 111A-E. Geofence indications column 203 indicates geofence indications associated with each of location indications 111A-E. Device location column 204 indicates device locations (including device locations L1-L5) associated with each of location indications 111A-E. Sample time column 205 represents sample times (including sample times ST1-ST5) associated with each of location indications 111A-E (with the letters ST in sample time column 205 being an abbreviation for sample time). ST1 is the earliest sample time, followed by ST2, then ST3, then ST4, and then ST5 being the latest sample time. Receive time column 206 indicates receive times (including receive times R1-R5) associated with each of location indications 111A-E (with the letters RT in receive time column 206 being an abbreviation for receive time). RT1 is the earliest receive time, followed by RT2, then RT3, then RT4, and then RT5 being the latest receive time. The receive times may correspond to a time that each location indication 111A-E is received for processing, such as by a processing component of the location service 100 (e.g., breach detection component 105). Geofence events column 207 indicates geofence events associated with each of location indications 111A-E.

Geofence events may be computed based on the difference (D) in state between a given location indication and the previously received location indication. For example, based on location indication 111A, it may be determined that object 131 is in geofences G1 and G2 at sample time ST1. Additionally, based on location indication 111B, it may be determined that object 131 is in geofences G2, G3 and G5 at sample time ST2. Thus, based on this difference in state (the difference between S1 and S2), it may be determined that, between sample time ST1 and ST2, the object 131 exited geofence G1 and entered geofences G3 and G5. This is shown in geofence events column 207 in the row corresponding to location indication 111B.

As another example, based on location indication 111B, it may be determined that object 131 is in geofences G2, G3 and G5 at sample time ST2. Additionally, based on location indication 111C, it may be determined that object 131 is in geofence G2 at sample time ST3. Thus, based on this difference in state (the difference between S2 and S3), it may be determined that, between sample time ST2 and ST3, the object 131 exited geofences G3 and G5. This is shown in geofence events column 207 in the row corresponding to location indication 111C.

As another example, based on location indication 111C, it may be determined that object 131 is in geofence G2 at sample time ST3. Additionally, based on location indication 111D, it may be determined that object 131 is in geofence G2 at sample time ST4. Thus, there is no difference in state between S3 and S4. This is shown in geofence events column 207 in the row corresponding to location indication 111D.

As another example, based on location indication 111D, it may be determined that object 131 is in geofence G2 at sample time ST4. Additionally, based on location indication 111E, it may be determined that object 131 is in geofences G6 and G7 at sample time ST5. Thus, based on this difference in state (the difference between S4 and S5), it may be determined that, between sample time ST4 and ST5, the object 131 exited geofence G2 and entered geofences G6 and G7. This is shown in geofence events column 207 in the row corresponding to location indication 111E.

In the example of FIG. 2, location indications 111A-E are received for processing in the same order in which they are sampled, as indicated by the values shown in sample time column 205 and receive time column 206 of FIG. 2. Thus, in the example of FIG. 3, out-of-order location detection component may evaluate the sample times and receive times shown in FIG. 2 and may make a determination 210 that no out-of-order location indications are detected based on the data shown in FIG. 2.

Figure 3:
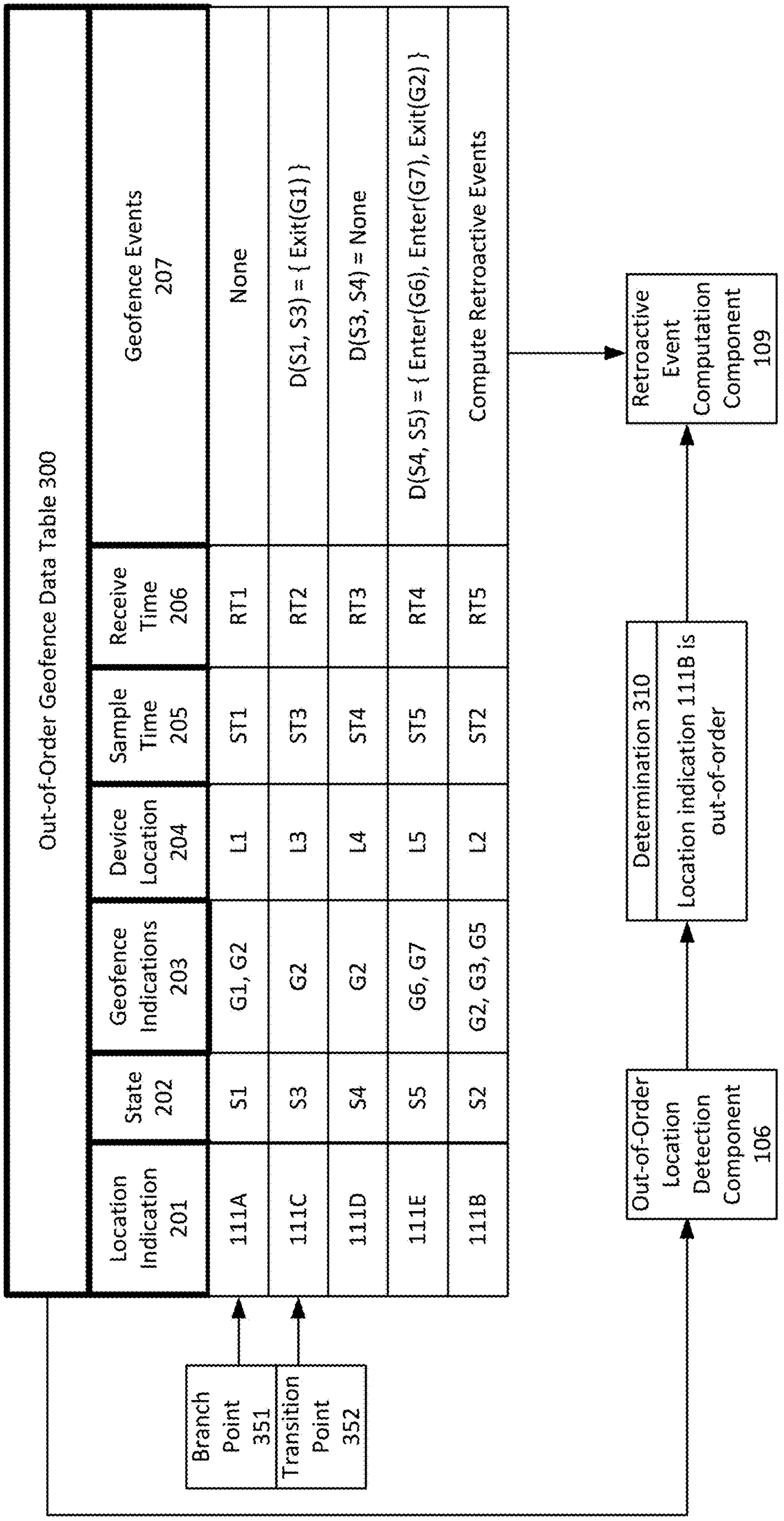
FIG. 3 is a diagram illustrating an example out-of-order geofence data that may be used in accordance with the present description.

However, in some other examples, location indications may not be received for processing in the same order in which they are sampled. Referring now to FIG. 3, out-of-order geofence data table 300 shows data corresponding to an example in which location indication 111B is an out-of-order location indication. Specifically, as shown in sample time column 205 of FIG. 3, location indication 111B is sampled at sample time ST2. Thus, location indication 111B is sampled prior to location indications 111C-E, which are sampled at sample times ST3-ST5. Also, as shown in receive time column 206 of FIG. 3, location indication is received for processing at receive time RT5. Thus, location indication 111B is received after location indications 111C-E, which are received at receive times RT2-RT4. Accordingly, in the example of FIG. 3, location indication 111B is sampled before location indications 111C-E are sampled, but location indication 111B is not received until after location indications 111C-E are received. Based on this information, it may be determined that location indication 111B is an out-of-order location indication.

Because location indication 111B is out-of-order, the geofence events that are calculated based on the data in FIG. 3 differ from the geofence events that are calculated based on the data in FIG. 2. The difference in calculated geofence events can be seen by comparing the values in geofence events column 207 of FIG. 2 with the values in geofence events column 207 of FIG. 3. For example, in FIG. 3, for location indication 111C, the system will compare the state (S3) associated with location indication 111C to the state (S1) associated with location indication 111A instead of the state. This is because, in the example of FIG. 3, location indication 111C is the next location indication that is received subsequent to location indication 111A. This causes the geofence events for location indication 111C to be computed incorrectly. Specifically, based on location indication 111A, it may be determined that object 131 is in geofences G1 and G2 at sample time ST1. Additionally, based on location indication 111C, it may be determined that object 131 is in geofence G2 at sample time ST3. Thus, based on this difference in state (the difference between S1 and S3), it may be determined that, between sample time ST1 and ST3, the object 131 exited geofence G1.

Location indication 111B indicates that the object 131 was within geofences G2, G3 and G5 at sample time S2. Thus, if location indication 111B had been received prior to location indication 111C (as in the example of FIG. 2), it would be apparent that, between sample time ST1 and sample time ST2, the object 131 entered geofences G3 and G5. Additionally, if location indication 111B had been received prior to location indication 111C (as in the example of FIG. 2), it would be apparent that, between sample time ST2 and sample time ST3, the object 131 exited geofences G3 and G5. However, in the example of FIG. 3, because location indication 111B is not received prior to location indication 111C, the processing system is unaware that object 131 entered geofences G3 and G5 between sample time ST1 and sample time ST2 and then subsequently exited geofences G3 and G5 between sample time ST2 and sample time ST3. The location service 100 may therefore initially fail to notify the customer of the corresponding geofence entrance and exit events for geofences G3 and G5.

However, based on the techniques described herein, the location service may detect that location indication 111B is an out-of-order location indication and may compute retroactive geofence events associated with location indication 111B, which in this example include the entrance and exiting of geofences G3 and G5. Specifically, in this example, out-of-order location detection component 106 may, upon receipt of location indication 111B, make a determination 310 that location indication 111B is an out-of-order location indication. The determination 310 may be made by detecting that location indication 111B was sampled prior to location indications 111C-E, and that location indication 111B was received after location indications 111C-E. The out-of-order location detection component 106 may then provide an indication (e.g., tag, marker, etc.) that the state data associated with location indication 111B is out-of-order. This state data may include indications that the object 131 is in geofences G2, G3 and G5 at sample time ST2. The retroactive event detection component 109 may then process this out-of-order state data to compute retroactive geofence events associated with location indication 111B.

To compute the retroactive geofence events associated with location indication 111B, the retroactive event detection component 109 may determine a branch point location indication associated with location indication 111B. A branch point 351 is an occurrence at which a system diverges from a state it would have achieved if it had processed information in a correct order. In this example, the branch point location indication is the last location indication that was sampled prior to location indication 111B, which is location indication 111A. Referring now to FIG. 4, it is shown that the retroactive event detection component 109 may compute one or more first induced geofence events 401. The first induced geofence events 401 are computed based on a first state difference between the out-of-order location indication (location indication 111B) and the branch point location indication (location indication 111A). As shown in FIG. 2, state S1 corresponds to location indication 111A, and state S2 corresponds to location indication 111B. Thus, the first induced geofence events 401 are computed based on a difference (D) between S1 and S2. As also shown in FIG. 2, at state S1 (determined based on location indication 111A), the object 131 is in geofences G1 and G2. Additionally, at state S2 (determined based on location indication 111B), the object 131 is in geofences G2, G3 and G5. Thus, based on this difference in state (the difference between S1 and S2), it may be determined that, between sample times ST1 and ST2, the object 131 exited geofence G1 and entered geofences G3 and G5. This is shown in geofence events column 207 of FIG. 2 in the row corresponding to location indication 111B. Accordingly, in this example, as shown in FIG. 4, the first induced geofence events 401 are entering geofences G3 and G5 and exiting geofence G1.

The retroactive event detection component 109 may also determine a transition point location indication based on a transition point 352, which corresponds to a next sampled location indication after the out-of-order location indication. Thus, the transition point location indication is the next sampled location indication after the out-of-order location indication, which in this example is location indication 111C. The retroactive event detection component 109 may then compute one or more second induced geofence events 402 based on a second state difference between the out-of-order location indication (location indication 111B) and the transition point location indication (location indication 111C). As shown in FIG. 2, state S2 corresponds to location indication 111B, and state S3 corresponds to location indication 111C. Thus, the second induced geofence events 402 are computed based on a difference (D) between S2 and S3. As also shown in FIG. 2, at state S2 (determined based on location indication 111B), the object 131 is in geofences G2, G3 and G5. Additionally, at state S3 (determined based on location indication 111C), the object 131 is in geofence G2. Thus, based on this difference in state (the difference between S2 and S3), it may be determined that, between sample times ST2 and ST3, the object 131 exited geofences G3 and G5. This is shown in geofence events column 207 of FIG. 2 in the row corresponding to location indication 111C. Accordingly, in this example, as shown in FIG. 4, the second induced geofence events 402 are exiting geofences G3 and G5.

As also shown in FIG. 4, the retroactive event detection component 109 may compute an event union 403 between the first induced geofence events 401 and the second induced geofence events 402. As described above, the first induced geofence events 401 are entering geofences G3 and G5 and exiting geofence G1. Additionally, the second induced geofence events 402 are exiting geofences G3 and G5. Thus, the event union 403 is exiting geofences G3 and G5, entering geofences G3 and G5 and exiting geofence G1.

Referring now to FIG. 5, it is shown that the retroactive event detection component 109 may compute relevant previously reported events 501. The relevant previously reported events 501 are events that were already reported by the location service 100 and that correspond to a third state difference between the branch point location indication (location indication 111A) and the transition point location indication (location indication 111C). As described above, the transition point location indication (location indication 111C) is the next location indication sampled after the out-of-order location indication (location indication 111B). Thus, the relevant previously reported events 501 are computed based on a difference (D) between S1 and S3. As shown in FIG. 3, at state S1 (determined based on location indication 111A), the object 131 is in geofences G1 and G2. Additionally, at state S3 (determined based on location indication 111C), the object 131 is in geofence G2. Thus, based on this difference in state (the difference between S1 and S3), it may be determined that, between sample times ST1 and ST3, the object 131 exited geofence G1. This is shown in geofence events column 207 of FIG. 3 in the row corresponding to location indication 111C. Accordingly, in this example, as shown in FIG. 5, the relevant previously reported events 501 are exiting geofence G1.

At event subtraction 502, the relevant previously reported events 501 are subtracted from the event union 403. In this example, the event union 403 is exiting geofences G3 and G5, entering geofences G3 and G5 and exiting geofence G1. Additionally, in this example, the relevant previously reported events 501 are exiting geofence G1. Accordingly, the result of event subtraction 502 is a set of events including exiting geofences G3 and G5 and entering geofences G3 and G5. The retroactive geofence events 503 are then identified as the result of event subtraction 502. Specifically, in this example, the retroactive geofence events 503 include exiting geofences G3 and G5 and entering geofences G3 and G5. In particular, geofences G3 and G5 were entered between sample times ST1 and ST2, and geofences G3 and G5 were exited between sample times ST2 and ST3. Upon computing the retroactive geofence events 503, the computing service may provide notifications of the retroactive geofence events 503 to account 141.

Figure 6:
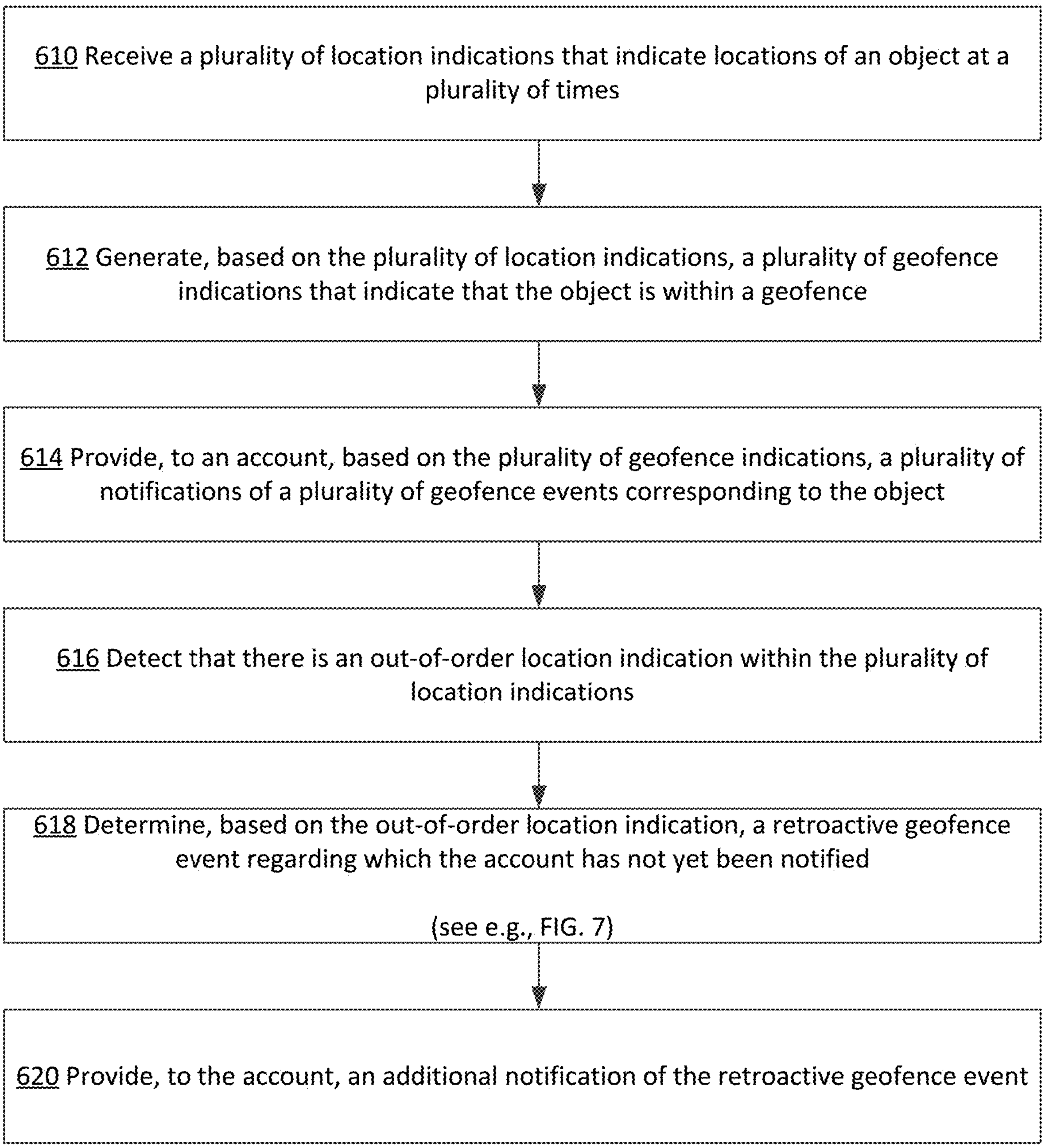
FIG. 6 is a flowchart illustrating an example retroactive geofence event notification process that may be used in accordance with the present description.

FIG. 6 is a flowchart illustrating an example retroactive geofence event notification process that may be used in accordance with the present description. At operation 610, a plurality of location indications are received that indicate locations of an object at a plurality of times. For example, as shown in location indications column 201 of FIG. 3, location indications 111A-E may be received. In some examples, the plurality of location indications may be received for processing by a breach detection component 105 of a location service 100. The location indications 111A-E may indicate sampled locations of object 131 over time. Each location indication may include location information, such as longitude and latitude coordinates representing the object's current location at the time of sampling. Each location indication may also include time information (e.g., a timestamp) indicating a time at which the location is sampled by the object.

At operation 612, a plurality of geofence indications that indicate that the object is within a geofence are generated based on the plurality of location indications. For example, FIG. 3 includes a geofence indications column 203 that shows geofence indications corresponding to each of location indications 111A-E that are identified in location indications column 201. The geofence indications may be determined by comparing location information (e.g., longitude and latitude) with a location indication to stored location information (e.g., longitude and latitude). As a specific example, a given geofence may occupy an area having longitude thirty-nine degrees north to forty-one degrees north and latitude twenty-nine degrees west to thirty-one degrees west. A given location indication may indicate that, at sample time STY, a given object has a location of longitude forty degrees north and latitude thirty degrees west. In this example, the given object would be determined to be within the given geofence at sample time STY. In addition to indicating that a given object is within a given geofence, a geofence indication may also indicate the given sample time for the object's location upon which the geofence indication is based (e.g., sample time STY in the above example).

At operation 614, a plurality of notifications of a plurality of geofence events corresponding to the object are provided, to an account, based on the plurality of geofence indications. In some examples, the plurality of geofence events may comprise a geofence entering event corresponding to the object making a geofence entrance and a geofence exiting event corresponding to the object making a geofence exit. Also, in some examples, the plurality of geofence events may comprise a geofence crossing event indicating that the object has crossed a geofence boundary, such as without specifically indicating whether the crossing relates to entering or exiting the geofence. The geofence events may be determined by comparing a state (e.g., indicated by geofence indications) for a given location indication to a state of the previous location indication (e.g., indicated by geofence indications). For example, as shown in FIG. 3, based on location indication 111D, it may be determined that object 131 is in geofence G2 at sample time ST4. Additionally, based on location indication 111E, it may be determined that object 131 is in geofences G6 and G7 at sample time ST5. Thus, based on this difference in state (the difference between S4 and S5), it may be determined that, between sample time ST4 and ST5, the object 131 exited geofence G2 and entered geofences G6 and G7. This is shown in geofence events column 207 in the row corresponding to location indication 111E. As shown in FIG. 1, geofence event notifications 110 of detected geofence events may be provided by location service 100 to account 141.

At operation 616, it is detected that there is an out-of-order location indication within the plurality of location indications. An out-of-order location indication is a location indication that is received sufficiently late that the associated system has already processed one or more subsequent location indications that should have been processed after the out-of-order location indication. An out-of-order location indication may be detected by comparing the sample time of the out-of-order location indication to the sample times of one more previously received location indications. If a sample time of a given location indication is earlier than the sample time of one or more previously received location indications, then the given location indication may be detected as an out-of-order location indication. Specifically, as shown in sample time column 205 of FIG. 3, location indication 111B is sampled at sample time ST2. Thus, location indication 111B is sampled prior to location indications 111C-E, which are sampled at sample times ST3-ST5. Also, as shown in receive time column 206 of FIG. 3, location indication is received for processing at receive time RT5. Thus, location indication 111B is received after location indications 111C-E, which are received at receive times RT2-RT4. Accordingly, in the example of FIG. 3, location indication 111B is sampled before location indications 111C-E are sampled, but location indication 111B is not received until after location indications 111C-E are received. Based on this information, it may be determined that location indication 111B is an out-of-order location indication.

At operation 618, a retroactive geofence event regarding which the account has not yet been notified is determined based on the out-of-order location indication. As described above, a retroactive geofence event is a corrective geofence event that changes an incorrect reality of a system. For example, a retroactive geofence event may be triggered by an out-of-order location indication because a processing component may be unaware of locations/states associated with the out-of-order location indication at the time that one or more subsequently sampled location indications are being processed. This may, for example, cause the processing component to be unaware of state (e.g., location) transitions between the out-of-order location indication and a previously sampled location indication. This may also, for example, cause the processing component to be unaware of state (e.g., location) transitions between the out-of-order location indication and a subsequently sampled location indication. In some examples, to determine a retroactive geofence event, the location service may determine state (e.g., location) transitions between the out-of-order location indication and a previously sampled location indication. The location service may also determine state (e.g., location) transitions between the out-of-order location indication and a subsequently sampled location indication. The location service may then compute a union of geofence events based on these transitions and subtract out geofence events that have already been reported to the account. Some example processes for computing a retroactive geofence event are described in detail below with reference to FIG. 7.

At operation 620, an additional notification of the retroactive geofence event is provided to the account. In some examples, the location service may allow the customer to configure options for retroactive event notifications. For example, in some cases, a customer may wish to only receive retroactive event notifications for certain types of events. As an example, a customer could select to receive retroactive event notifications only for geofence exit events but not geofence entrance events (or vice-versa). As another example, a customer could select to receive retroactive event notifications only for certain geofences, such as only for Geofences G1 and G7 and not for geofences G2-G6. Thus, in some examples, a location service may receive, from the account, an indication of at least one of a selected type of geofence event or a selected geofence for which the account chooses to receive retroactive geofence event notifications.

Figure 7:
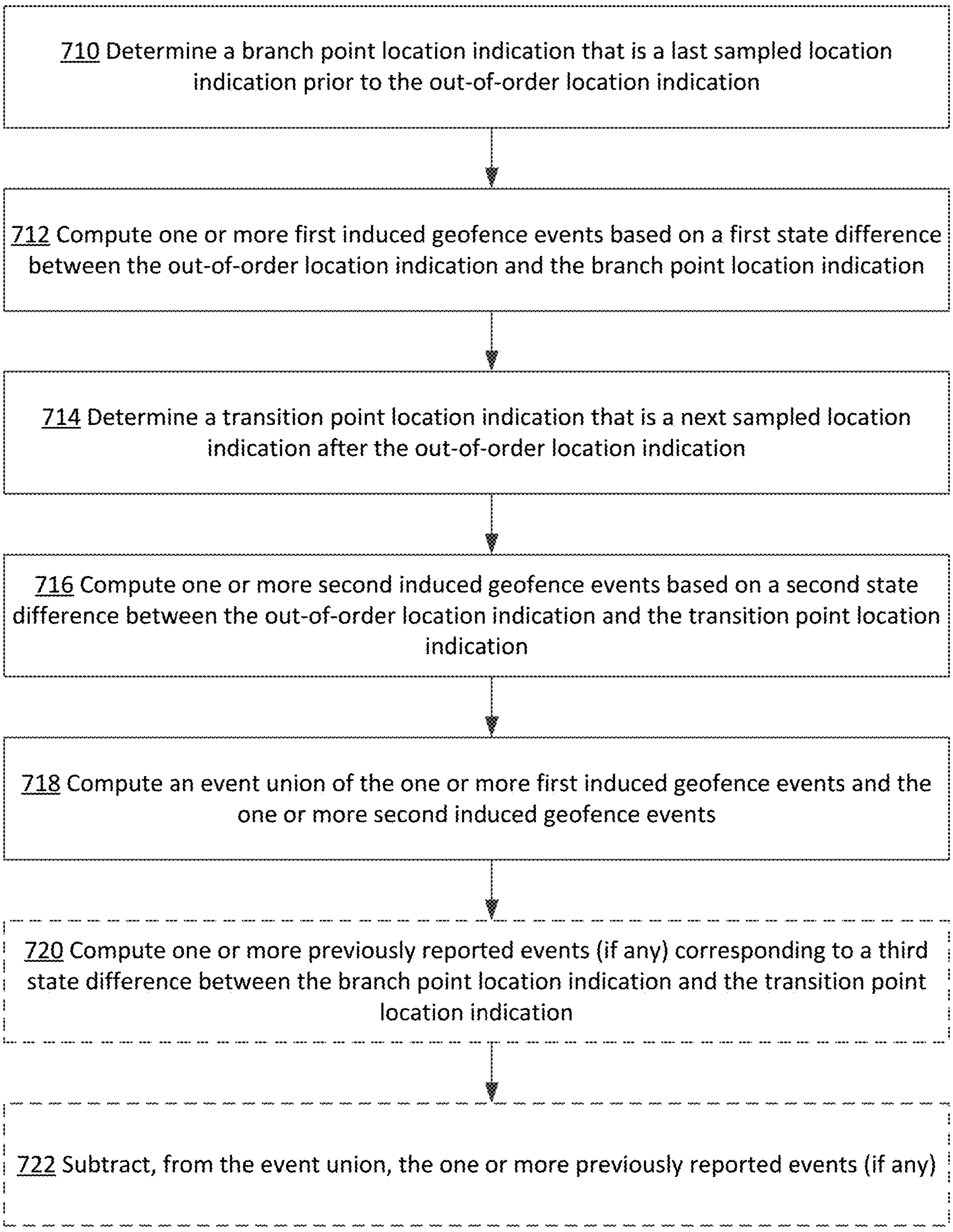
FIG. 7 is a flowchart illustrating an example retroactive geofence event computation process that may be used in accordance with the present description.

FIG. 7 is a flowchart illustrating an example retroactive geofence event notification process that may be used in accordance with the present description. In some examples, any, or all, of operations 710-722 may be included in operation 618 of FIG. 6. At operation 710, a branch point location indication is determined that is a last sampled location indication prior to the out-of-order location indication. Techniques for detection of an out-of-order location indication are described above (e.g., with respect to operation 616 of FIG. 6) and are not repeated here. A branch point is an occurrence at which a system diverges from a state it would have achieved if it had processed information in a correct order. The branch point location indication may, therefore, be the last location indication that was sampled prior to the out-of-order location indication. The branch point location indication may be determined by comparing the sample time of the out-or-order location indication to the sample times of other received location indications. The received location indication having the latest sample time prior to the out-of-order location indication may then be identified as the branch point location indication.

At operation 712, one or more first induced geofence events are computed based on a first state difference between the out-of-order location indication and the branch point location indication. For example, as shown in FIG. 4, the first induced geofence events 401 may be computed based on a first state difference between the out-of-order location indication (location indication 111B) and the branch point location indication (location indication 111A). As shown in FIG. 2, state S1 corresponds to location indication 111A, and state S2 corresponds to location indication 111B. Thus, the first induced geofence events 401 are computed based on a difference (D) between S1 and S2. As also shown in FIG. 2, at state S1 (determined based on location indication 111A), the object 131 is in geofences G1 and G2. Additionally, at state S2 (determined based on location indication 111B), the object 131 is in geofences G2, G3 and G5. Thus, based on this difference in state (the difference between S1 and S2), it may be determined that, between sample times ST1 and ST2, the object 131 exited geofence G1 and entered geofences G3 and G5. This is shown in geofence events column 207 of FIG. 2 in the row corresponding to location indication 111B. Accordingly, in this example, as shown in FIG. 4, the first induced geofence events 401 are entering geofences G3 and G5 and exiting geofence G1.

At operation 714, a transition point location indication is determined that is a next sampled location indication after the out-of-order location indication. The transition point location indication may be determined by comparing the sample time of the out-or-order location indication to the sample times of other received location indications. The received location indication having the earliest sample time after the out-of-order location indication may then be identified as the transition point location indication.

At operation 716, one or more second induced geofence events are computed based on a second state difference between the out-of-order location indication and the transition point location indication. For example, as shown in FIG. 4, the second induced geofence events 402 may be computed based on a second state difference between the out-of-order location indication (location indication 111B) and the transition point location indication (location indication 111C). As shown in FIG. 2, state S2 corresponds to location indication 111B, and state S3 corresponds to location indication 111C. Thus, the second induced geofence events 402 are computed based on a difference (D) between S2 and S3. As also shown in FIG. 2, at state S2 (determined based on location indication 111B), the object 131 is in geofences G2, G3 and G5. Additionally, at state S3 (determined based on location indication 111C), the object 131 is in geofence G2. Thus, based on this difference in state (the difference between S2 and S3), it may be determined that, between sample times ST2 and ST3, the object 131 exited geofences G3 and G5. This is shown in geofence events column 207 of FIG. 2 in the row corresponding to location indication 111C. Accordingly, in this example, as shown in FIG. 4, the second induced geofence events 402 are exiting geofences G3 and G5.

At operation 718, an event union is computed of the one or more first induced geofence events and the one or more second induced geofence events. For example, as shown in FIG. 4, event union 403 may be computed between the first induced geofence events 401 and the second induced geofence events 402. As described above, the first induced geofence events 401 are entering geofences G3 and G5 and exiting geofence G1. Additionally, the second induced geofence events 402 are exiting geofences G3 and G5. Thus, the event union 403 is exiting geofences G3 and G5, entering geofences G3 and G5 and exiting geofence G1.

At operation 720, one or more previously reported events are computed corresponding to a third state difference between the branch point location indication and the transition point location indication. For example, as shown in FIG. 5, it is shown that the relevant previously reported events 501 are events that were already reported by the location service 100 and that correspond to a third state difference between the branch point location indication (location indication 111A) and the transition point location indication (location indication 111C). As described above, the transition point location indication (location indication 111C) is the next location indication sampled after the out-of-order location indication (location indication 111B). Thus, the relevant previously reported events 501 are computed based on a difference (D) between S1 and S3. As shown in FIG. 3, at state S1 (determined based on location indication 111A), the object 131 is in geofences G1 and G2. Additionally, at state S3 (determined based on location indication 111C), the object 131 is in geofence G2. Thus, based on this difference in state (the difference between S1 and S3), it may be determined that, between sample times ST1 and ST3, the object 131 exited geofence G1. This is shown in geofence events column 207 of FIG. 3 in the row corresponding to location indication 111C. Accordingly, in this example, as shown in FIG. 5, the relevant previously reported events 501 are exiting geofence G1. Operations 720 and 722 are shown in dashed lines in FIG. 7 because, in some examples, there may not be a state difference between the branch point location indication and the transition point location indication, such as when the object is within the same geofences at the sampling times of the branch point location indication and the transition point location indication.

At operation 722, the one or more previously reported events are subtracted from the event union. For example, at event subtraction 502 of FIG. 5, the relevant previously reported events 501 are subtracted from the event union 403. In this example, the event union 403 is exiting geofences G3 and G5, entering geofences G3 and G5 and exiting geofence G1. Additionally, in this example, the relevant previously reported events 501 are exiting geofence G1. Accordingly, the result of event subtraction 502 is a set of events including exiting geofences G3 and G5 and entering geofences G3 and G5. The retroactive geofence events 503 are then identified as the result of event subtraction 502. Specifically, in this example, the retroactive geofence events 503 include exiting geofences G3 and G5 and entering geofences G3 and G5. In particular, geofences G3 and G5 were entered between sample times ST1 and ST2, and geofences G3 and G5 were exited between sample times ST2 and ST3. Upon computing the retroactive geofence events 503, the computing service may provide notifications of the retroactive geofence events 503 to account 141.

Figure 8:
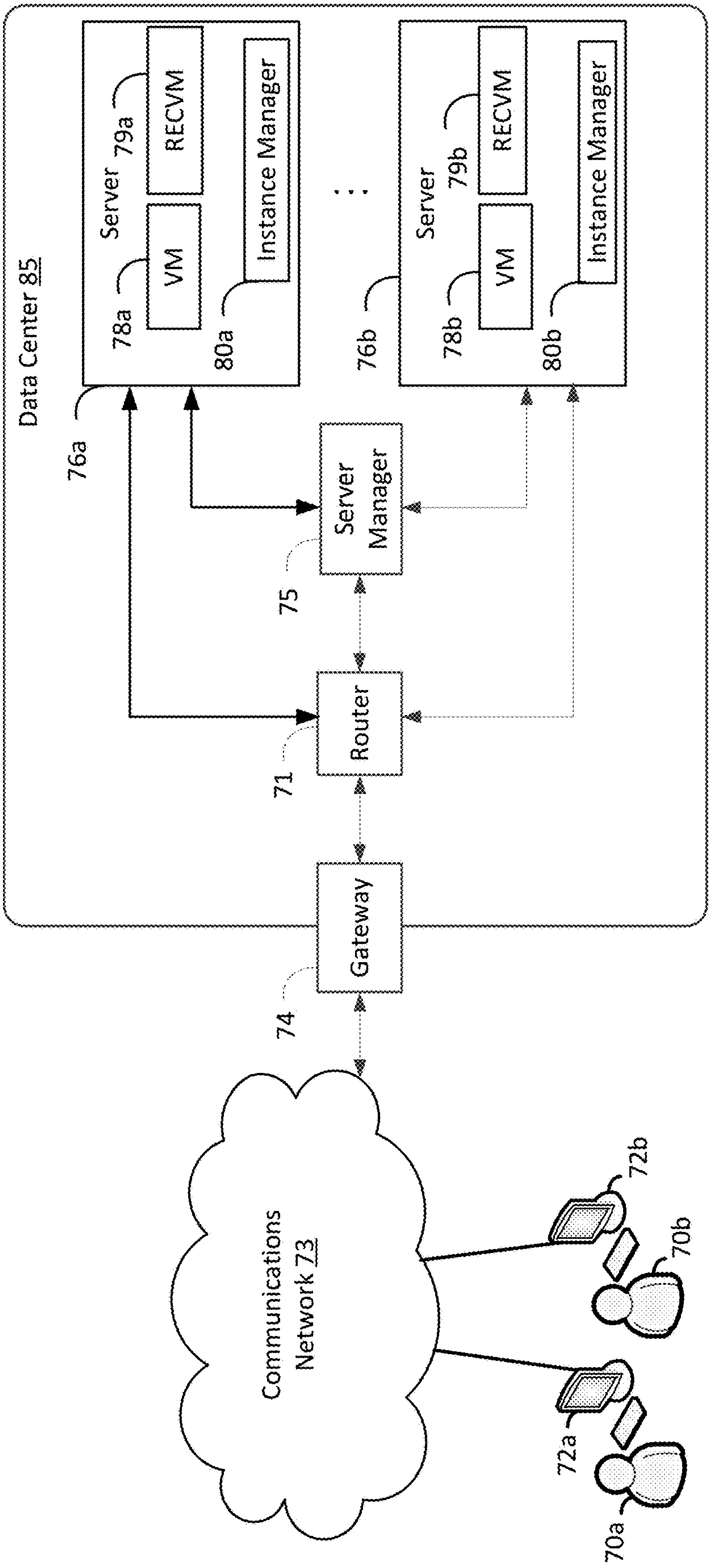
FIG. 8 is a diagram illustrating an example system for transmitting and providing data that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include retroactive event computation virtual machines (RECVM's) 79*a-b*, which are virtual machines that are configured to execute any, or all, of the retroactive geofence event computation and notification techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
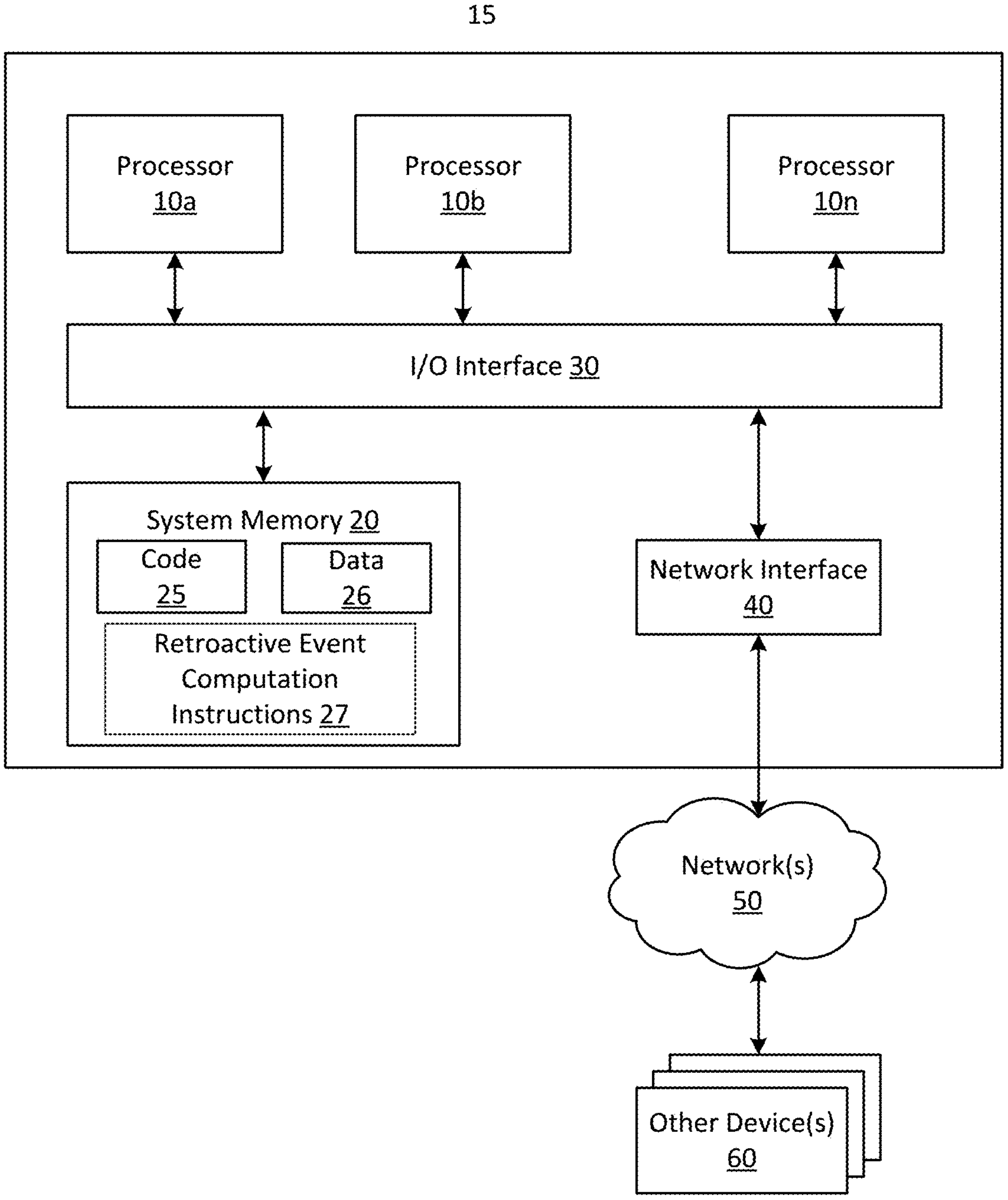
FIG. 9 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes retroactive event computation instructions 27, which are instructions for executing any, or all, of the retroactive geofence event computation and notification techniques and other techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up." migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

receiving a plurality of location indications that indicate locations of an object at a plurality of times;

generating, based on the plurality of location indications, a plurality of geofence indications that indicate that the object is within a geofence;

providing, to an account, based on the plurality of the plurality of geofence indications, a plurality of notifications of a plurality of geofence events corresponding to the object, wherein the plurality of geofence events comprise a geofence entering event corresponding to the object making a geofence entrance and a geofence exiting event corresponding to the object making a geofence exit;

detecting that there is an out-of-order location indication within the plurality of location indications, wherein the out-of-order location indication is sampled prior to one or more other location indications that are received prior to the out-of-order location indication;

determining, based on the out-of-order location indication, a retroactive geofence event regarding which the account has not yet been notified; and providing, to the account, an additional notification of the retroactive geofence event.

2. The computing system of claim 1, wherein the determining of the retroactive geofence event further comprises:

computing one or more first induced geofence events based on a first state difference between the out-of-order location indication and a branch point location indication that is a last sampled location indication prior to the out-of-order location indication.

3. The computing system of claim 2, wherein the determining of the retroactive geofence event further comprises:

computing one or more second induced geofence events based on a second state difference between the out-of-order location indication and a transition point location indication that is a next sampled location indication after the out-of-order location indication.

4. The computing system of claim 3, wherein the determining of the retroactive geofence event further comprises:

computing an event union of the one or more first induced geofence events and the one or more second induced geofence events.

5. A computer-implemented method comprising:

receiving a plurality of location indications that indicate locations of an object at a plurality of times;

generating, based on the plurality of location indications, a plurality of geofence indications that indicate that the object is within a geofence;

providing, to an account, based on the plurality of the plurality of geofence indications, a plurality of notifications of a plurality of geofence events corresponding to the object;

detecting that there is an out-of-order location indication within the plurality of location indications;

determining, based on the out-of-order location indication, a retroactive geofence event regarding which the account has not yet been notified; and providing, to the account, an additional notification of the retroactive geofence event.

6. The computer-implemented method of claim 5, wherein the plurality of geofence events comprise a geofence entering event corresponding to the object making a geofence entrance and a geofence exiting event corresponding to the object making a geofence exit.

7. The computer-implemented method of claim 5, wherein the out-of-order location indication is sampled prior to one or more other location indications that are received prior to the out-of-order location indication.

8. The computer-implemented method of claim 5, wherein the determining of the retroactive geofence event comprises:

determining a branch point location indication that is a last sampled location indication prior to the out-of-order location indication.

9. The computer-implemented method of claim 8, wherein the determining of the retroactive geofence event further comprises:

computing one or more first induced geofence events based on a first state difference between the out-of-order location indication and the branch point location indication.

10. The computer-implemented method of claim 9, wherein the determining of the retroactive geofence event further comprises:

computing one or more second induced geofence events based on a second state difference between the out-of-order location indication and a transition point location indication that is a next sampled location indication after the out-of-order location indication.

11. The computer-implemented method of claim 10, wherein the determining of the retroactive geofence event further comprises:

computing an event union of the one or more first induced geofence events and the one or more second induced geofence events.

12. The computer-implemented method of claim 11, wherein the determining of the retroactive geofence event further comprises:

subtracting, from the event union, one or more previously reported events corresponding to a third state difference between the branch point location indication and the transition point location indication.

13. The computer-implemented method of claim 5, further comprising:

receiving, from the account, an indication of at least one of a selected type of geofence event or a selected geofence for which the account chooses to receive retroactive geofence event notifications.

14. One or more non-transitory computer-readable storage media having stored thereon computing instructions that, upon execution by one or more computing devices, cause the one or more computing devices to perform computing operations comprising:

receiving a plurality of location indications that indicate locations of an object at a plurality of times;

generating, based on the plurality of location indications, a plurality of geofence indications that indicate that the object is within a geofence;

providing, to an account, based on the plurality of the plurality of geofence indications, a plurality of notifications of a plurality of geofence events corresponding to the object;

detecting that there is an out-of-order location indication within the plurality of location indications;

determining, based on the out-of-order location indication, a retroactive geofence event regarding which the account has not yet been notified; and providing, to the account, an additional notification of the retroactive geofence event.

15. The one or more non-transitory computer-readable storage media of claim 14, wherein the plurality of geofence events comprise a geofence entering event corresponding to the object making a geofence entrance and a geofence exiting event corresponding to the object making a geofence exit.

16. The one or more non-transitory computer-readable storage media of claim 14, wherein the out-of-order location indication is sampled prior to one or more other location indications that are received prior to the out-of-order location indication.

17. The one or more non-transitory computer-readable storage media of claim 14, wherein the determining of the retroactive geofence event comprises:

computing one or more first induced geofence events based on a first state difference between the out-of-order location indication and a branch point location indication that is a last sampled location indication prior to the out-of-order location indication.

18. The one or more non-transitory computer-readable storage media of claim 17, wherein the determining of the retroactive geofence event further comprises:

computing one or more second induced geofence events based on a second state difference between the out-of-order location indication and a transition point location indication that is a next sampled location indication after the out-of-order location indication.

19. The one or more non-transitory computer-readable storage media of claim 18, wherein the determining of the retroactive geofence event further comprises:

computing an event union of the one or more first induced geofence events and the one or more second induced geofence events.

20. The one or more non-transitory computer-readable storage media of claim 19, wherein the determining of the retroactive geofence event further comprises:

subtracting, from the event union, one or more previously reported events corresponding to a third state difference between the branch point location indication and the transition point location indication.

* * * * *